(12) United States Patent
Kita

(10) Patent No.: US 10,372,227 B2
(45) Date of Patent: Aug. 6, 2019

(54) INFORMATION DISPLAY DEVICE, INFORMATION DISPLAY SYSTEM, AND NON-TRANSITORY COMPUTER-READABLE STORAGE MEDIUM

(71) Applicant: CASIO COMPUTER CO., LTD., Shibuya-ku, Tokyo (JP)

(72) Inventor: Kazunori Kita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 8 days.

(21) Appl. No.: 15/613,821

(22) Filed: Jun. 5, 2017

(65) Prior Publication Data
US 2017/0269702 A1    Sep. 21, 2017

Related U.S. Application Data

(63) Continuation of application No. 14/081,813, filed on Nov. 15, 2013, now Pat. No. 9,703,384.

(30) Foreign Application Priority Data

Dec. 13, 2012    (JP) ................................ 2012-272749

(51) Int. Cl.
 *G06F 1/16* (2006.01)
 *G06F 3/01* (2006.01)
 *G06F 3/0346* (2013.01)
(52) U.S. Cl.
 CPC .............. *G06F 3/017* (2013.01); *G06F 1/163* (2013.01); *G06F 3/0346* (2013.01)

(58) Field of Classification Search
 CPC .......... G06F 3/017; G06F 3/0346; G06F 1/163
 See application file for complete search history.

(56) References Cited

U.S. PATENT DOCUMENTS 8,797,331 B2    8/2014  Sano et al.
2006/0028429 A1*  2/2006  Kanevsky ............... G06F 3/011
                                                345/156

(Continued)

FOREIGN PATENT DOCUMENTS

CN    101363743 A    2/2009
JP    11232013 A    8/1999

(Continued)

OTHER PUBLICATIONS

Japanese Office Action dated Feb. 27, 2018 issued in counterpart Japanese Application No. 2017-026778.

(Continued)

*Primary Examiner* — Brent D Castiaux
(74) *Attorney, Agent, or Firm* — Holtz, Holtz & Volek PC

(57) ABSTRACT

An information display device including a device body; a display configured to display information; a motion detection sensor provided in the device body; and a processor. The processor is configured to acquire a plurality of types of information; detect a predetermined action of a user from output data of the motion detection sensor; and selectively display, on the display, one of the acquired plurality of types of information based on a set display order, each time the processor detects the same predetermined action of the user. The display order is set by an operation which is performed at an external device, and which is not performed at the information display device itself.

25 Claims, 9 Drawing Sheets

(56) References Cited

U.S. PATENT DOCUMENTS

| | | |
|---|---|---|
| 2009/0040231 A1 | 2/2009 | Sano et al. |
| 2010/0156676 A1 | 6/2010 | Mooring et al. |
| 2011/0059769 A1* | 3/2011 | Brunolli ............ G08C 17/02 |
| | | 455/556.1 |
| 2011/0074671 A1 | 3/2011 | Shimosato et al. |
| 2012/0054794 A1* | 3/2012 | Kim ............ G06F 3/0346 |
| | | 725/38 |
| 2013/0135200 A1 | 5/2013 | Iwashita |
| 2013/0246949 A1* | 9/2013 | Kikuchi ............ G06F 3/0484 |
| | | 715/765 |
| 2014/0306884 A1 | 10/2014 | Sano et al. |

FOREIGN PATENT DOCUMENTS

| | | | |
|---|---|---|---|
| JP | 2002373176 A | 12/2002 | |
| JP | 2004274182 A | 9/2004 | |
| JP | 2005057587 A | 3/2005 | |
| JP | 2010009575 A | 1/2010 | |
| JP | 2011205547 A | 10/2011 | |
| JP | 2012038271 A | 2/2012 | |
| JP | 2012118652 A | 6/2012 | |
| JP | 2012216149 A | 11/2012 | |
| JP | 2012242852 A | 12/2012 | |
| JP | 2015164058 A | 9/2015 | |

OTHER PUBLICATIONS

Japanese Office Action dated Oct. 24, 2017 issued in counterpart Japanese application No. 2015-087181.

Chinese Office Action (and English translation thereof) dated Mar. 28, 2016, issued in counterpart Chinese Application No. 201310682974.8.

Japanese Office Action (and English translation thereof) dated Jan. 10, 2016 issued in Japanese counterpart Application No. 2015-087181.

Japanese Office Action (and English translation thereof) dated Sep. 6, 2016, issued in counterpart Japanese Application No. 2015-087181.

Japanese Office Action dated Jan. 6, 2015, issued in counterpart Japanese Application No. 2012-272749.

Keene, "Sony SmartWatch Review", Mar. 19, 2012, The Verge, http://www.theverge.com/2012/3/19/2876341 /sony-smartwatch-review.

Mashita, et al., "A Content Search System for Mobile Devices based on User Context Recognition", Mar. 4-8, 2012, Virtual Reality Short Papers and Posters (VRW), 2012 IEEE.

* cited by examiner

| RESTING (NORMAL) | MAIL | 53 |
| | WEATHER FORECAST | |
| | NEWS | |
| | ... | |
| | ... | |
| WALKING | WHERE YOU ARE NOW (MAP SERVICE) | |
| | WEATHER FORECAST | |
| | SCHEDULE | |
| | TWITTER | |
| | NEWS | |
| ... | ... | |
| | ... | |
| | ... | |
| | ... | |
| | ... | |

| WALKING | SENSOR OUTPUT DATA | ~54 |
| DRIVING | SENSOR OUTPUT DATA | |
| TRAIN | SENSOR OUTPUT DATA | |

INFORMATION DISPLAY DEVICE, INFORMATION DISPLAY SYSTEM, AND NON-TRANSITORY COMPUTER-READABLE STORAGE MEDIUM

CROSS-REFERENCE TO RELATED APPLICATIONS

This is a Continuation of U.S. Ser. No. 14/081,813, filed Nov. 15, 2013, which is based upon and claims the benefit of priority from prior Japanese Patent Application No. 2012-272749, filed Dec. 13, 2012, the entire contents of both of which are incorporated herein by reference.

BACKGROUND

1. Technical Field

The present invention relates to an information display device and an information display system that display various types of information distributed on the Internet and to a non-transitory computer-readable storage medium used in the information display device.

2. Related Art

With the rapid spread of mobile terminals such as smartphones (multi-functional mobile-phone units), we are facing a flood of services for distributing various types of information on the Internet. Users are accordingly having enormous difficulty in choosing and displaying necessary information alone.

In order to deal with the above problem, there has been developed the system as disclosed in Japanese Patent Application Laid-Open No. 2002-373176, in which a server grasps the respective state histories of users and selectively distributes information in accordance with the states from among various types of information.

The system, however, still suffers from a disadvantage that since various types of information on the Internet is usually displayed by mobile terminals such as smartphones, extremely troublesome operations for starting an app (an abbreviation for application software) by touching an icon on a screen are required every time the information is to be displayed.

The present invention has been made in view of the above disadvantage and aims to provide an information display device, an information display system, and a non-transitory computer-readable storage medium that can easily display information that users need from among various types of information on the Internet.

SUMMARY

An information display device according to an aspect of the present invention includes:
 a device body;
 a display section configured to display information;
 a motion detection sensor provided in the device body;
 an information acquiring section configured to acquire a plurality of types of information;
 an action detection section configured to detect a predetermined action of a user from output data of the motion detection sensor; and
 a display control section configured to selectively display, in the display section, the plurality of types of information acquired by the information acquiring section, in a set order, every time the action detection section detects the predetermined action of the user.

An information display system according to an aspect of the present invention includes:
 a body-worn device; and
 an electronic device, wherein the body-worn device includes:
 a device body;
 a display section;
 a motion detection sensor provided in the device body;
 an information acquiring section configured to acquire a plurality of types of information from the electronic device;
 an action detection section configured to detect a predetermined action of a user from output data of the motion detection sensor; and
 a display control section configured to selectively display, in the display section, the plurality of types of information acquired by the information acquiring section, in a set order, every time the action detection section detects the predetermined action of the user, and
 the electronic device includes:
 an information providing section configured to acquire information from a server storing information for the body-worn device and to output the acquired information to the body-worn device.

According to an embodiment of the present invention, information that users need can be easily displayed from among various types of information by the users taking a predetermined action.

DETAILED DESCRIPTION

An embodiment of the present invention will be described below with reference to the accompanying drawings.

Figure 1:
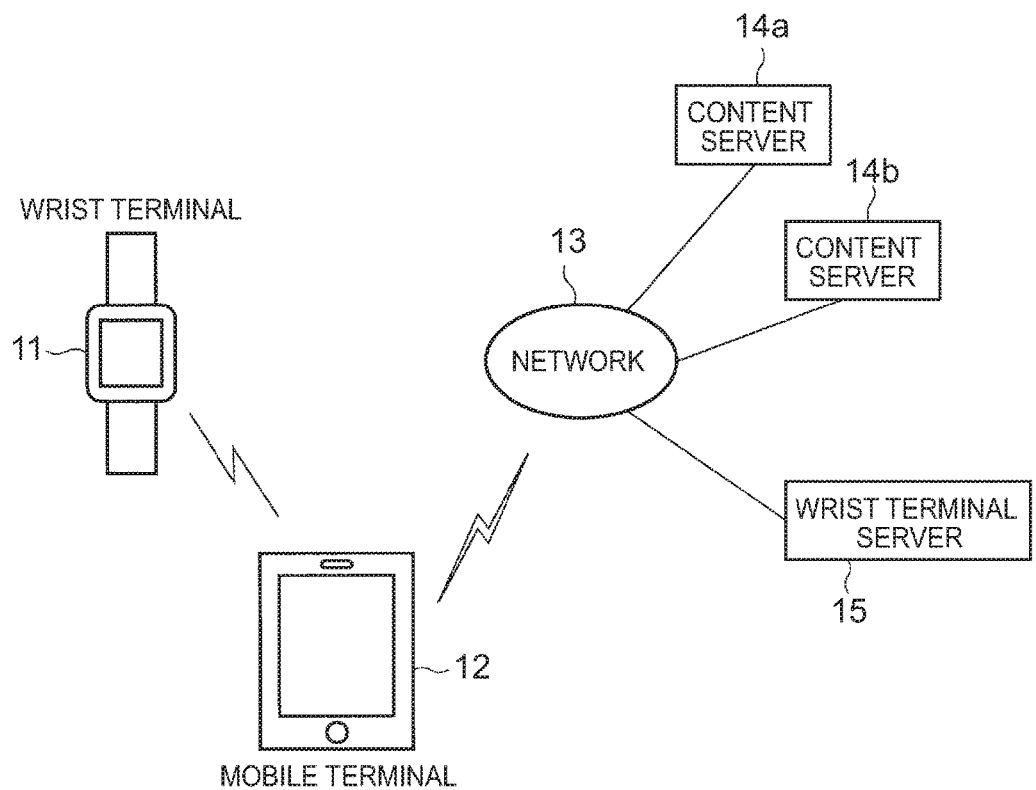
FIG. 1 is a diagram illustrating a configuration of a network system according to an embodiment of the present invention.

FIG. 1 is a diagram illustrating a configuration of a network system according to an embodiment of the present invention.

The network system includes a wrist terminal 11, a mobile terminal 12, and various types of content servers 14a, 14b, ... and a wrist terminal server 15 on a network 13 such as the Internet.

The wrist terminal 11 corresponds to the information display device according to an embodiment of the present invention. In the embodiment, the wrist terminal 11 is in the shape of a watch so as to be attached to a wrist of a user. On the other hand, the mobile terminal 12 is a mobile communication terminal device that a user can carry around in a bag, etc. and an example of the mobile terminal 12 is a smartphone. When the mobile terminal 12 is in the proximity of the wrist terminal 11, the wrist terminal 11 and the mobile terminal 12 are connected together by short-distance wireless communication such as Bluetooth (registered trade mark).

Further, the mobile terminal 12 has a function of being connected to the content servers 14a, 14b, ... and the wrist terminal server 15 on the network 13 via a wireless LAN (Wi-Fi) or a 3G mobile phone network, for example.

The content servers 14a, 14b, ... perform various services on the network 13, including distributing weather information on various areas, music, and movies. The wrist terminal server 15 is an exclusive server for managing information that the wrist terminal 11 deals with, and performs processing including processing information distributed from the content servers 14a, 14b, ... in accordance with the size of the screen of the wrist terminal 11.

The following is a method for using the wrist terminal 11 used as the information display device according to an embodiment of the present invention.

Figure 2:
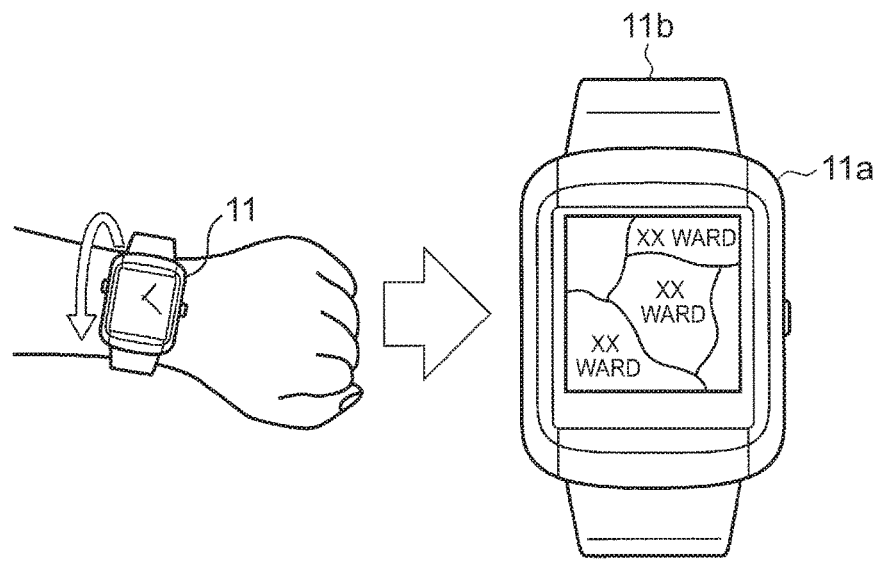
FIG. 2 is a view illustrating how a wrist terminal according to the embodiment is attached.
Figure 3:
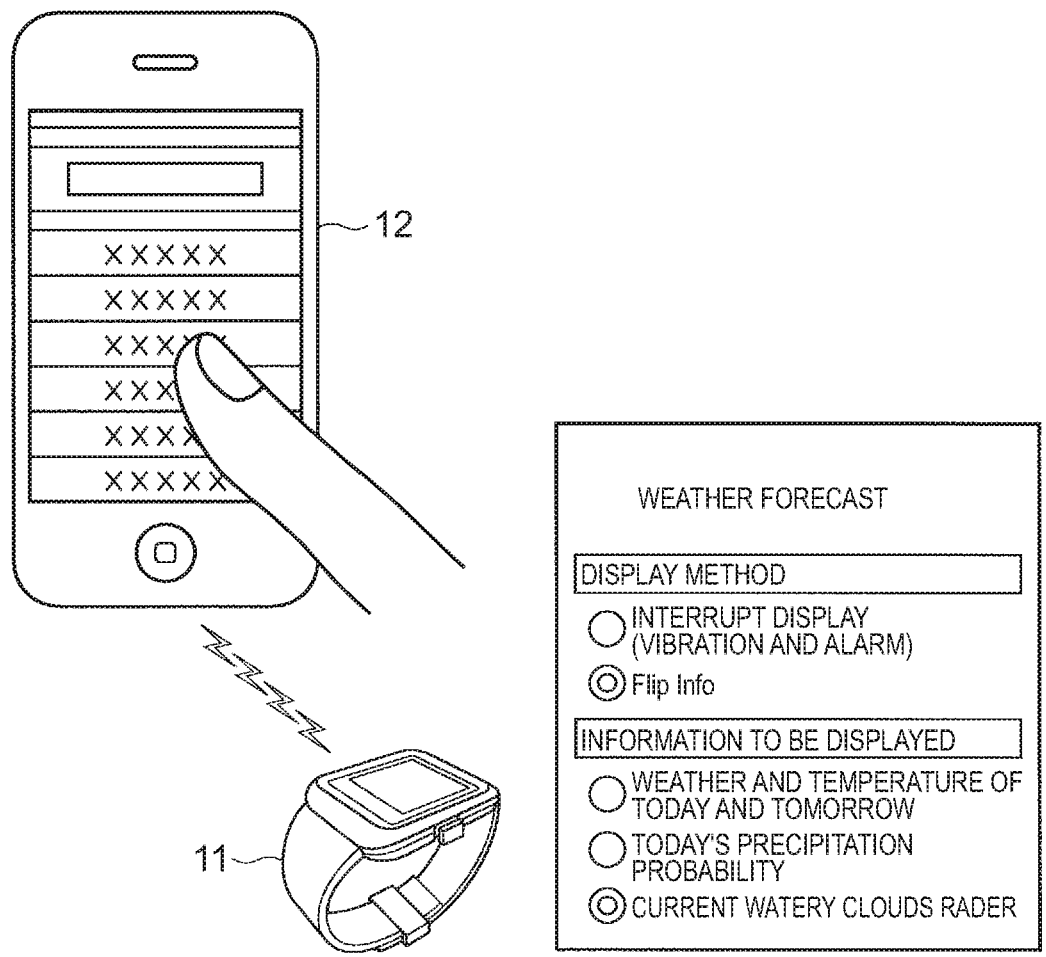
FIG. 3 is a view illustrating the relationship between the wrist terminal and a mobile terminal according to the embodiment.

FIG. 2 is a view illustrating an attachment state of the wrist terminal 11, and FIG. 3 is a view illustrating the relationship between the wrist terminal 11 and the mobile terminal 12.

As shown in FIG. 2, the wrist terminal 11 includes a device body 11a and a band 11b attached to each side of the device body 11a. As described later, the device body 11a of the wrist terminal 11 contains motion detection sensors such as an acceleration sensor and an angular rate sensor. In order to switch the display, a user needs to move his/her arm to the front of the face, with the wrist terminal 11 being attached to the wrist, and rotate the wrist (this is called a flip action).

As shown in FIG. 3, the wrist terminal 11 and the mobile terminal 12 are connected together by short-distance wireless communication such as Bluetooth (registered trade mark). The mobile terminal 12 receives information of the content servers 14a, 14b, ... and transmits the information to the wrist terminal 11. In this case, since the screen of the wrist terminal 11 is smaller than that of the mobile terminal 12, the wrist terminal server 15 shown in FIG. 1 processes the information of the content servers 14a, 14b, ... for the wrist terminal. The processed information is transmitted to the wrist terminal 11 via the mobile terminal 12 and is displayed.

The mobile terminal 12 determines which information to be displayed and how the information is to be displayed. The reason for using the mobile terminal 12 for the above determination is that the screen of the wrist terminal 11 is small. The mobile terminal 12 is equipped with an app for achieving synchronization of the determined contents between the mobile terminal 12 and the wrist terminal 11.

Figure 4:
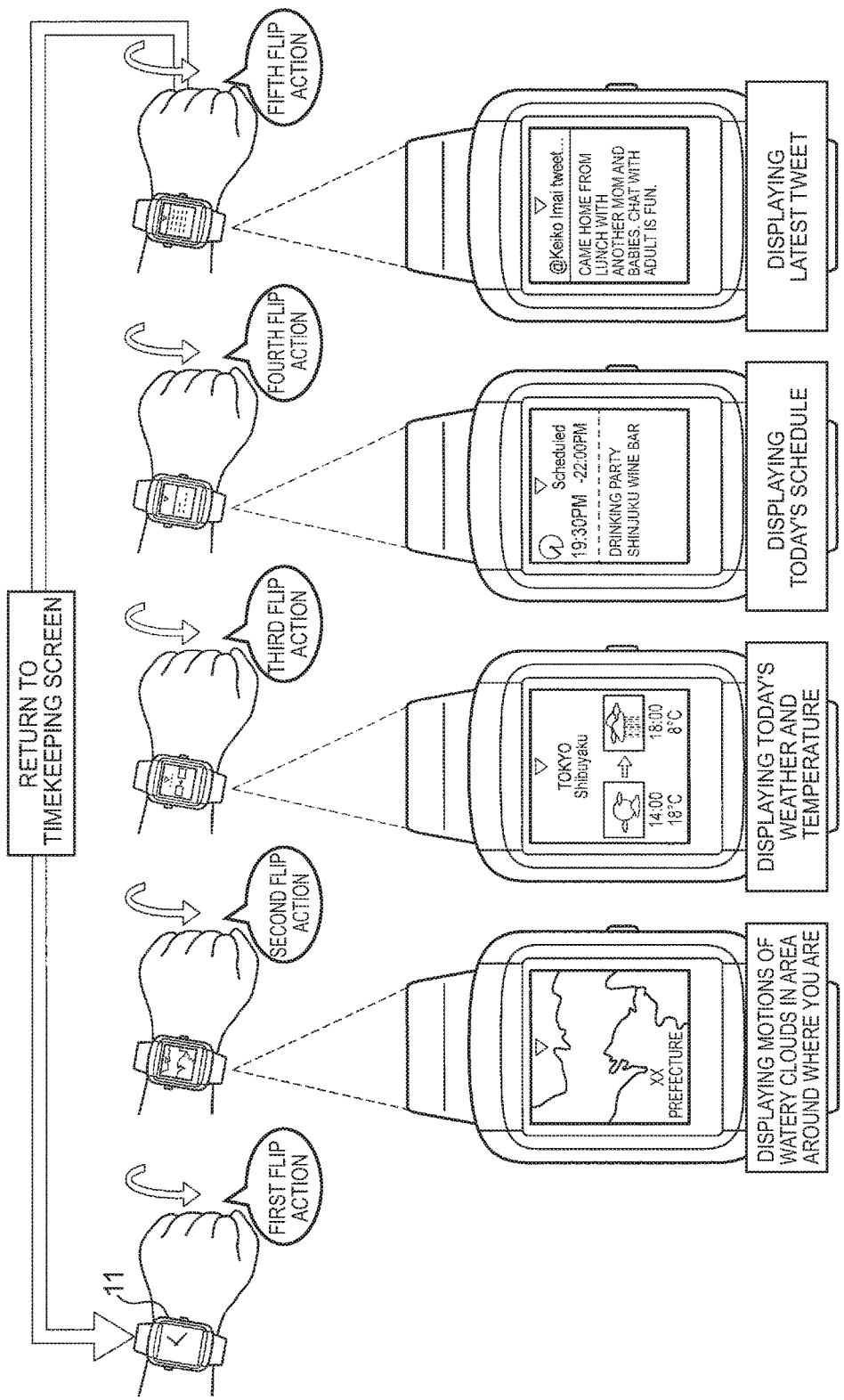
FIG. 4 is a view for describing a method for switching the display of the wrist terminal according to the embodiment.

FIG. 4 is a view for describing a method for switching the display of the wrist terminal 11.

The wrist terminal 11 can switch the display through a user's action of rotating his/her wrist (flip action). In the example shown in the drawing, an initial screen displays the time and then is sequentially switched to display the movements of watery clouds in the present area by a first flip action, weather information on a specified area by a second flip action, a schedule by a third flip action, and tweet information by a fourth flip action. The mobile terminal 12 can determine which information is to be displayed in what number of order.

The following is a detailed description of the configuration and operations of each unit.

Figure 5:
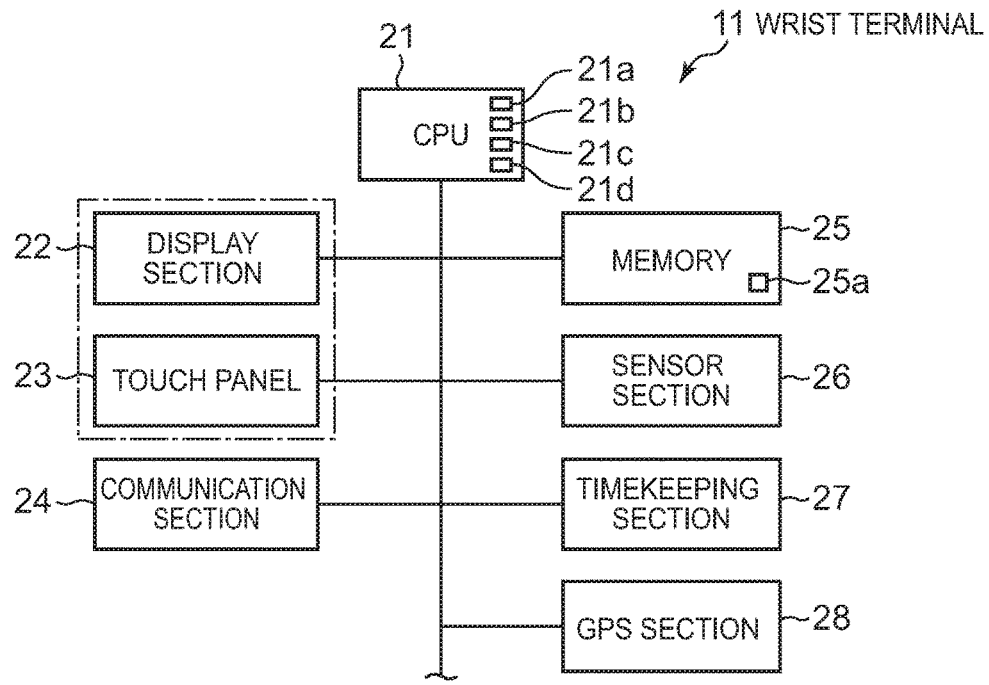
FIG. 5 is a block diagram illustrating a circuit configuration of the wrist terminal according to the embodiment.

FIG. 5 is a block diagram illustrating the circuit configuration of the wrist terminal 11.

The wrist terminal 11 includes a CPU 21, a display section 22, a touch panel 23, a communication section 24, a memory 25, a sensor section 26, a timekeeping section 27, a GPS section 28, and the like.

The CPU 21 controls the operations of the wrist terminal 11 by starting a program 25a stored in the memory 25. In the present embodiment, the CPU 21 is configured to carry out, through execution of programs, an information acquiring function 21a of acquiring various types of information, an action determining function 21b of determining a predetermined action of a user from output data of the sensor section 26, and a display controlling function 21c of selectively displaying information on an item set in advance from among the various types of information based on the predetermined action of the user.

Further, the CPU 21 is also configured to carry out a state determining function 21d of determining the state of the user from the output data of the sensor section 26. When the state determining function 21d is to be carried out, the display controlling function 21c selectively displays information on the item set in advance from among the various types of information based on the state and the predetermined action of the user.

The display section 22 is formed of a liquid crystal display (LCD) and color-displays various types of information. The touch panel 23 is placed on a display screen of the display section 22 and is used for performing an input instruction by a touching operation. The display section 22 and the touch panel 23 form an integrated input display system. With this system, users can perform an input instruction by a touching operation while watching the display of the screen.

The communication section 24 transmits and receives data to and from an external terminal (the mobile terminal 12 herein), respectively, by short-distance wireless communication such as Bluetooth (registered trade mark).

The memory 25 stores not only the program 25a for controlling the CPU 21 but also various data necessary for processing operations of the CPU 21. The program 25*a* includes programs for carrying out the above functions 21*a*, 21*b*, 21*c*, and 21*d*.

The sensor section 26 has motion detection sensors including a triaxial acceleration sensor that can detect respective accelerations in x-, y-, and z-axial directions. The timekeeping section 27 is for carrying out a timekeeping function of the wrist terminal 11 and indicates a present time. Further, the GPS section 28 detects a present location by a global positioning system (GPS).

Figure 6:
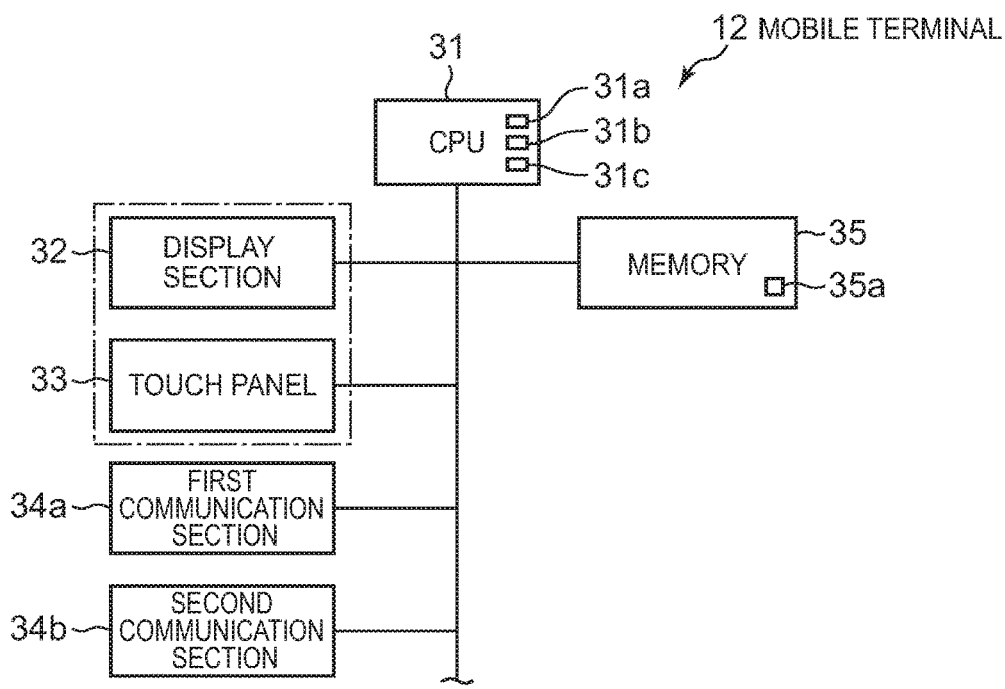
FIG. 6 is a block diagram illustrating a circuit configuration of the mobile terminal according to the embodiment.

FIG. 6 is a block diagram illustrating a circuit configuration of the mobile terminal 12.

The mobile terminal 12 includes a CPU 31, a display section 32, a touch panel 33, a first communication section 34*a*, a second communication section 34*b*, and a memory 35.

The CPU 31 controls the operations of the mobile terminal 12 by starting a program 35*a* stored in the memory 35. In the embodiment, the CPU 31 is configured to carry out, through execution of programs, a priority setting function 31*a* of setting the priority of information, an information collecting function 31*b* of collecting content information by periodically accessing the wrist terminal server 15, and an information transferring function 31*c* of transferring the content information to the wrist terminal 11.

As with the display section 22 and the touch panel 23 of the wrist terminal 11, the display section 32 and the touch panel 33 form an integrated input display system. With the system, users can perform an input instruction by a touching operation while watching the display of the screen.

The first communication section 34*a* transmits and receives data to and from an external terminal (the wrist terminal 11 herein), respectively, by wireless communication with a short-distance communication function such as Bluetooth (registered trade mark). The second communication section 34*b* accesses the content servers 14*a*, 14*b*, . . . and the wrist terminal server 15 on the network 13 via a wireless LAN (Wi-Fi) or a 3G mobile phone network, for example.

The memory 35 stores not only the program 35*a* for controlling the CPU 31 but also various data necessary for processing operations of the CPU 31. The program 35*a* includes programs for carrying out the above functions 31*a*, 31*b*, and 31*c*.

Note that the descriptions of the acceleration sensor, the GPS function, etc. that the mobile terminal 12 has as the wrist terminal 11 has will be omitted because they have no direct connection with the gist of the present invention.

Further, each of the content servers 14*a*, 14*b*, . . . and the wrist terminal server 15 is formed of a general-purpose computer having a CPU, a ROM, a RAM, etc. and will not be specifically described with reference to the drawings.

Subsequently, the operations of the network system according to the present embodiment will be described by dividing the operations into the respective operations of (a) the wrist terminal server 15, (b) the mobile terminal 12, and (c) the wrist terminal 11.

(a) Operations of the Wrist Terminal Server 15

Figure 7:
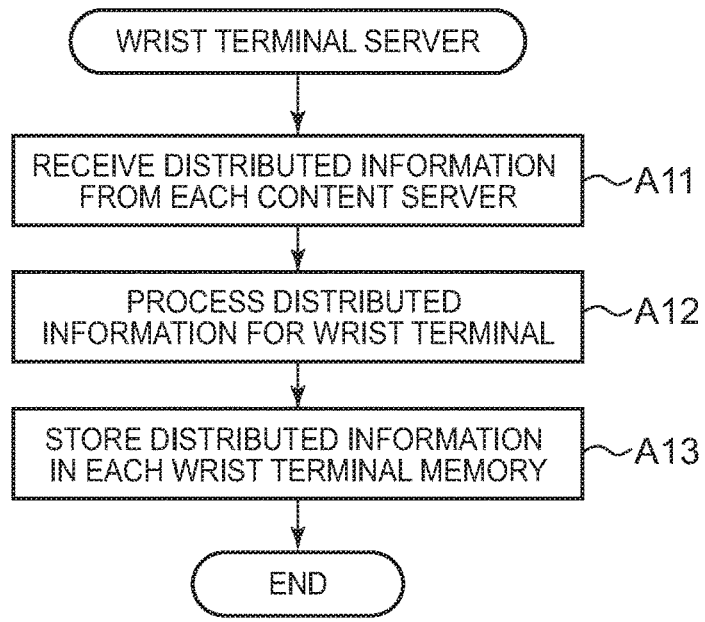
FIG. 7 is a flowchart illustrating operations of a wrist terminal server according to the embodiment.

FIG. 7 is a flowchart illustrating the operations of the wrist terminal server 15. The processing shown in the flowchart is executed in such a manner that a CPU (not shown in the drawing) installed in the wrist terminal server 15 reads a predetermined program.

Figure 8:
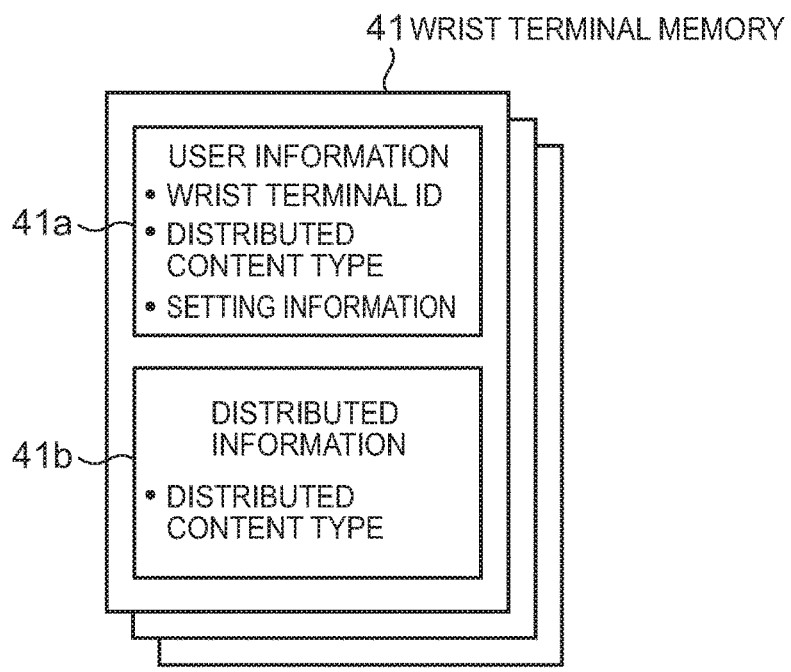
FIG. 8 is a diagram illustrating a configuration of a wrist terminal memory installed in the wrist terminal server according to the embodiment.

The wrist terminal server 15 receives information distributed from the content servers 14*a*, 14*b*, . . . on the network 13 (Step A11), and processes the distributed information for the wrist terminal (Step A12). The wrist terminal server 15 stores the processed distributed information into a wrist terminal memory 41 shown in FIG. 8 (Step A13).

The wrist terminal memory 41 is provided for each wrist terminal. The wrist terminal memory 41 stores, as user information 41*a*, unique ID information (identification information) of a user for the wrist terminal 11, a distributed content type that the user has selected, and other various setting information. Moreover, the wrist terminal memory 41 stores, as distributed information 41*b*, distributed information which has been received from the content servers 14*a*, 14*b*, . . . and processed for the wrist terminal. "Processed for the wrist terminal" in this context means performing processing such as editing content information in accordance with the screen of the wrist terminal 11, the size of which is substantially equal to the size of a watch.

The wrist terminal server 15 refers to the wrist terminal memory 41, selectively receives different types of content information in accordance with the individual needs of users, processes the information, and stores the information into the wrist terminal memory 41.

(b) Operations of the Mobile Terminal 12

Figure 9:
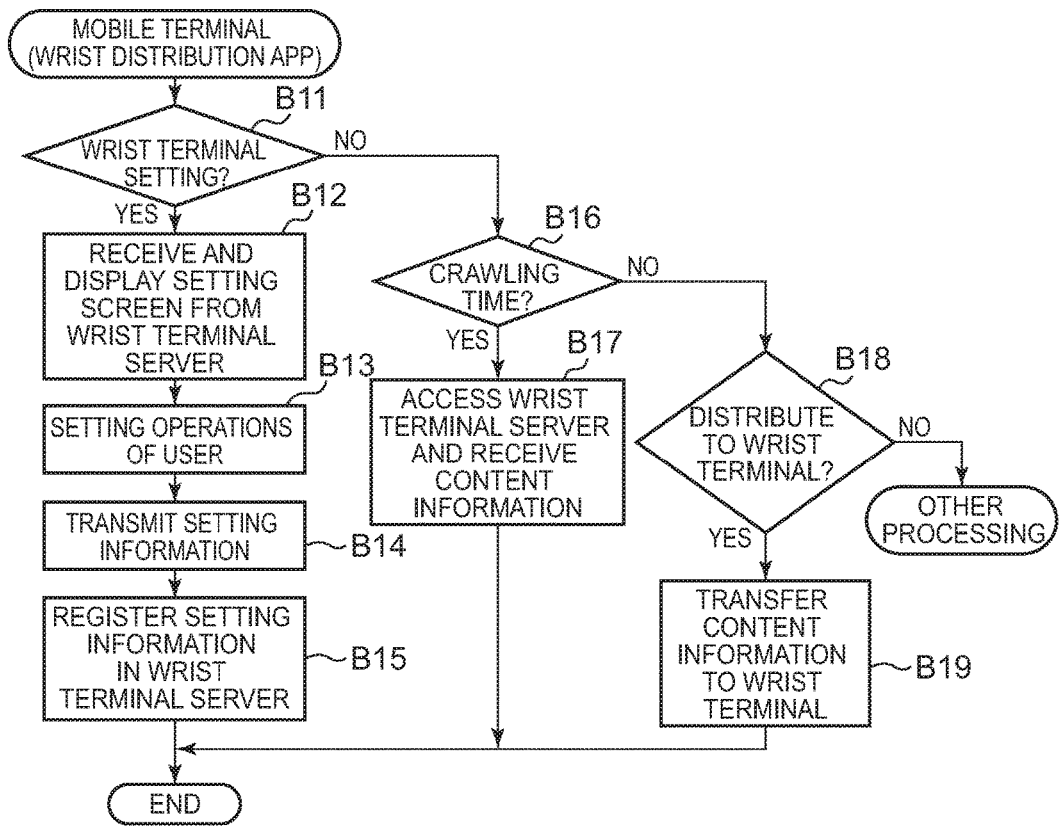
FIG. 9 is a flowchart illustrating operations of the mobile terminal with regard to a wrist distribution app according to the embodiment.

FIG. 9 is a flowchart illustrating the operations of the mobile terminal 12 with regard to a wrist distribution app. The processing shown in the flowchart is executed in such a manner that the CPU 31 installed in the mobile terminal 12 reads the program 35*a* stored in the memory 35.

First, a user taps a setting icon (not shown in the drawings) provided on the screen of the mobile terminal 12, to start a function of "wrist terminal setting". When this function is started ("Yes" in Step B11), the mobile terminal 12 is connected to the wrist terminal server 15 via the network 13, receives a predetermined setting screen for setting the wrist terminal from the wrist terminal server 15, and display the screen (Step B12).

When the user performs setting operations on the screen of the mobile terminal 12 (Step B13), the mobile terminal 12 holds, in the memory 35, the information set by the setting operations, as well as transmits the information to the wrist terminal 11 to store the information in the memory 25 of the wrist terminal 11 (Step B14). Further, the setting information is also transmitted to the wrist terminal server 15 so as to be registered into the wrist terminal memory 41 (Step B15).

With this setting information having been transmitted to the wrist terminal 11, desired content information is displayed in order of the set priority by a predetermined action taken by the user. Further, the user can check the set contents on the screen of the wrist terminal 11 at any time.

At the crawling times set in advance ("Yes" in Step B16), the mobile terminal 12 accesses the wrist terminal server 15 via the network 13 and receives the content information stored in the wrist terminal memory 41 (Step B17). The content information thus received is stored in a specific area of the memory 35. If the wrist terminal 11 sends a distribution request ("Yes" in Step B18), the mobile terminal 12 reads the content information stored in the specific area of the memory 35 and transfers the information to the wrist terminal 11 (Step B19). The content information transferred from the mobile terminal 12 to the wrist terminal 11 has been processed for the wrist terminal in the wrist terminal server 15.

The content information transferred to the wrist terminal 11 is displayed in order of the priority set in advance by the predetermined action taken by the user. This action is an action of rotating a wrist (flip action).

A method of setting the priority of information will be described below.

Figure 10:
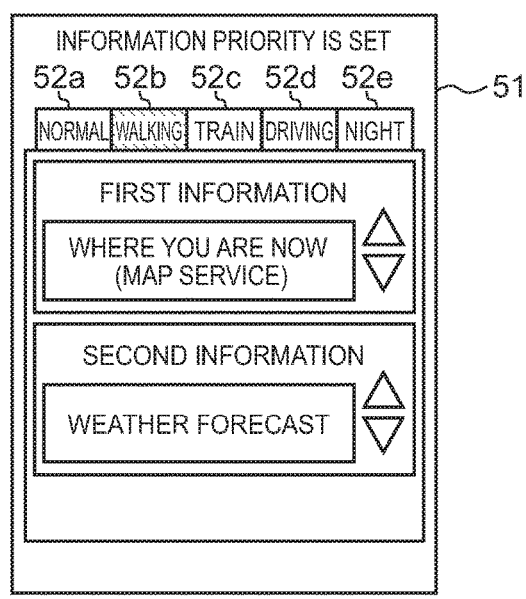
FIG. 10 is a view illustrating a configuration of a priority setting screen of the mobile terminal according to the embodiment.
Figures 11, 12:
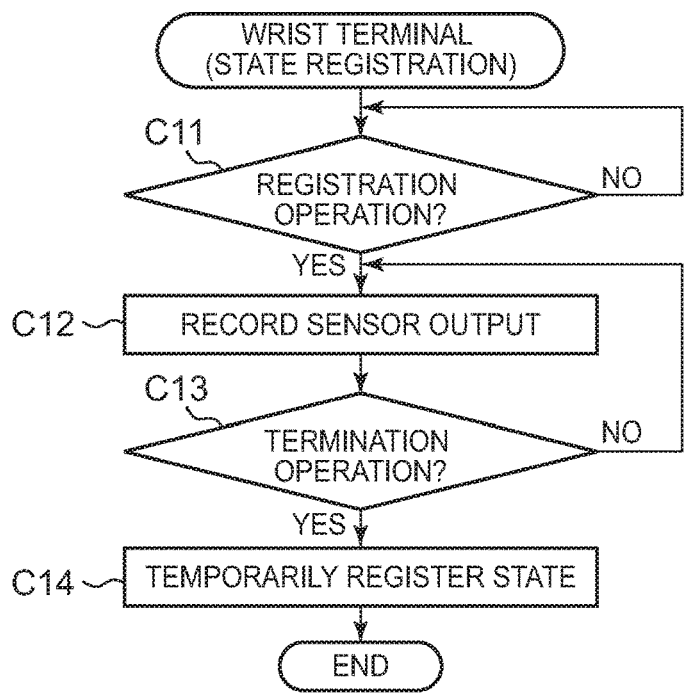
FIG. 11 is a view illustrating a configuration of a priority setting table installed in the mobile terminal according to the embodiment.
FIG. 12 is a flowchart illustrating operations for state registration processing of the wrist terminal according to the embodiment.

FIG. 10 is a view illustrating a configuration of a priority setting screen 51 of the mobile terminal 12. FIG. 11 is a view illustrating a configuration of a priority setting table 53.

The mobile terminal 12 has a function of setting the information priority. When a priority setting function is started by predetermined operations, the priority setting screen 51 is displayed in the display section 32 of the mobile terminal 12. The priority setting screen 51 has five selection items 52a to 52e of "normal", "walking", "train", "driving", and "night" as states related to users' daily life.

An information priority can be set for each of the selection items 52a to 52e. In the example of FIG. 10, "where you are now (map service)" and "weather information" are set as the first and second information, respectively, at walking. "First" and "second" in this context mean the number of actions of rotating the wrist (flip action).

When the information priority has been set, the setting contents are registered in the priority setting table 53 as shown in FIG. 11. The priority setting table 53 is provided in the memory 35 shown in FIG. 6 and the contents registered in the table 53 are transmitted to the wrist terminal 11 and the wrist terminal server 15 as the setting information of the wrist terminal 11 (Steps B14 and B15 in FIG. 9).

(c) Operations of the Wrist Terminal 11

FIG. 12 is a flowchart illustrating the operations of the state registration processing of the wrist terminal 11. The processing shown in the flowchart is executed in such a manner that the CPU 21 installed in the wrist terminal 11 reads the program 25a stored in the memory 25. This procedure applies to the processing shown in the flowcharts of FIGS. 14 and 15 described later, which is also executed by the CPU 21 reading the program 25a.

The wrist terminal 11 has the device body 11a, and the device body 11a is equipped with the sensor section 26. As the sensor section 26, a motion detection sensor such as an acceleration sensor is arranged. The wrist terminal 11 performs the following state registration processing so that output data of the motion detection sensor and the state of a user are associated with each other.

More specifically, when a user is walking, for example, the user taps a setting icon (not shown in the drawings) on the screen of the wrist terminal 11 to start the "state registration" function. When the "state registration" function has been started ("Yes" in Step C11), the wrist terminal 11 sequentially stores output data of the motion detection sensor provided in the sensor section 26 into a specific area of the memory 25 (Step C12).

Figures 13, 14:
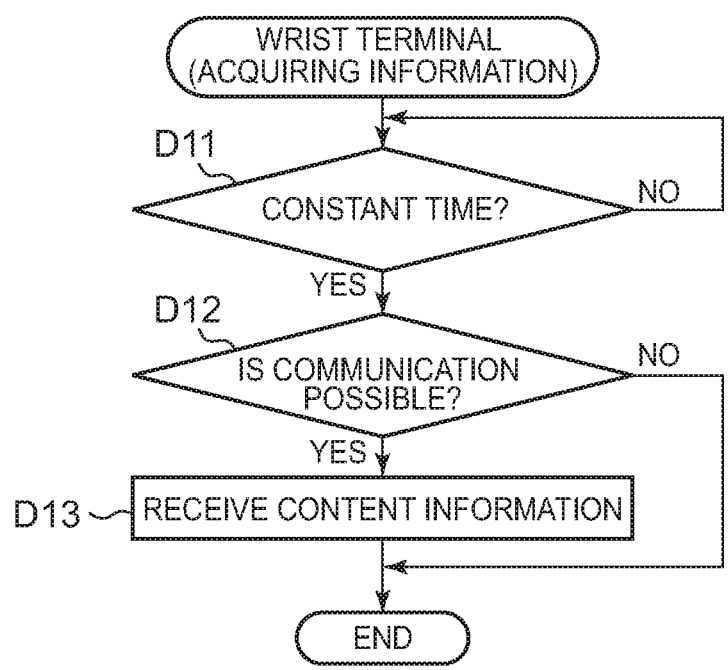
FIG. 13 is a view illustrating a configuration of a state table installed in the wrist terminal according to the embodiment.
FIG. 14 is a flowchart illustrating operations for information acquiring processing of the wrist terminal according to the embodiment.

When the operation of terminating the registration has been performed ("Yes" in Step C13), the wrist terminal 11 temporarily registers, as data on the state during walking, the output data of the sensor section 26 stored in the specific area of the memory 25, into a state table 54 shown in FIG. 13 (Step C14). The state table 54 is provided in the memory 25. The reason for making this registration temporary is that a user needs to appropriately check and determine the registered contents.

This procedure applies to the other states. In other words, performing the above state registration when the user is being in a normal situation, is driving, or is being on a train or at night makes it possible to associate the output data of the motion detection sensor obtained by actual motions of the user in the daily life with the respective states of the user when the user is making the motions. In this way, the state of the user can be correctly determined and information in accordance with the state at that moment can be preferentially displayed.

FIG. 14 is a flowchart illustrating the operations of the information acquiring processing of the wrist terminal 11.

The wrist terminal 11 checks a state of connection between the wrist terminal 11 and the mobile terminal 12 at regular intervals (Step D11) and determines whether communication therebetween is possible (Step D12). When communication is determined as possible, that is, when short-distance wireless communication is possible between the wrist terminal 11 and the mobile terminal 12 ("Yes" in Step D12), the wrist terminal 11 receives content information from the mobile terminal 12 and stores the information in the specific area of the memory 35 (Step D13). The content information is information that the mobile terminal 12 has periodically received from the wrist terminal server 15 (see FIG. 9, Step B17), and has been processed for the wrist terminal.

Figure 15:
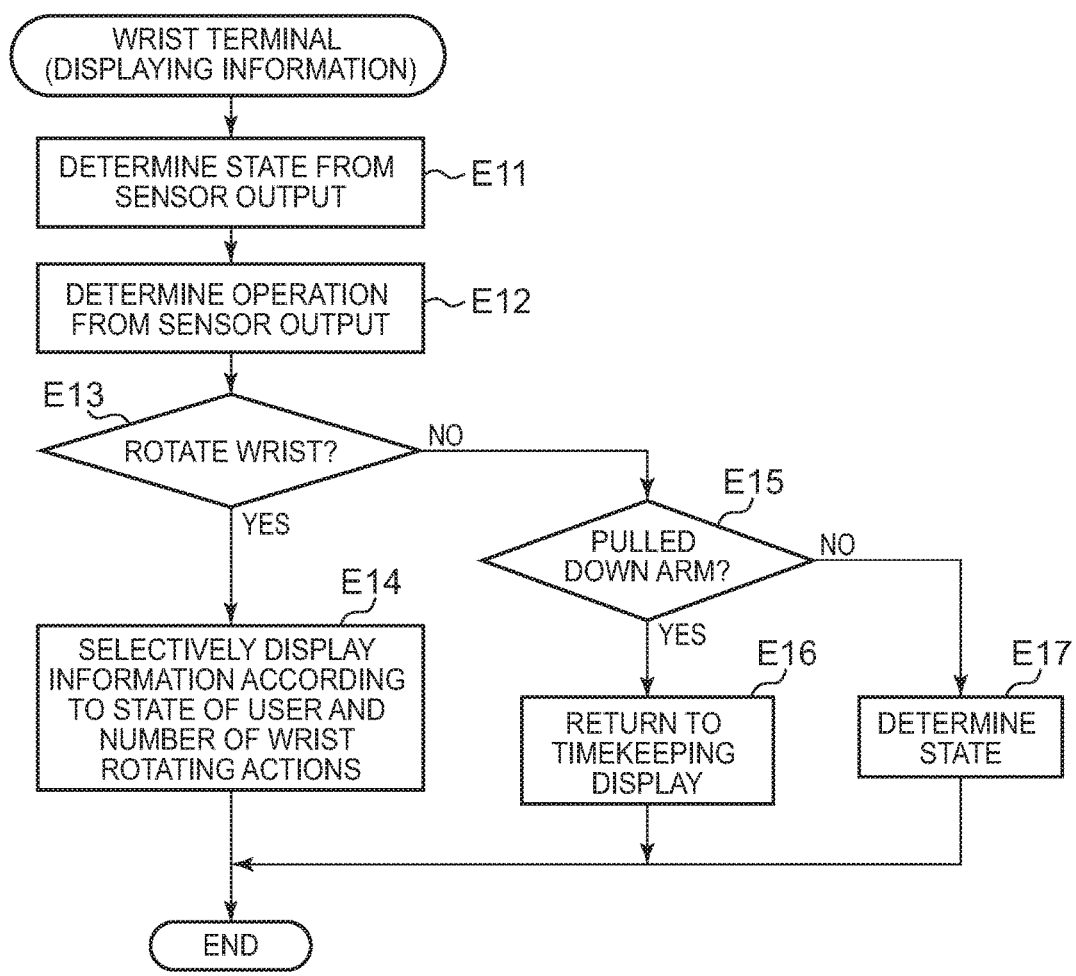
FIG. 15 is a flowchart illustrating operations for information display processing of the wrist terminal according to the embodiment.

FIG. 15 is a flowchart illustrating the operations of the information display processing of the wrist terminal 11.

The wrist terminal 11 analyzes the output data of the motion detection sensor provided to the sensor section 26 and determines the state of a user based on the analysis result (Step E11). Specifically, the wrist terminal 11 determines which one of the states "normal", "walking", "train", "driving", and "night" the output data of the sensor section 26 corresponds to, with reference to the state table 54 shown in FIG. 13.

When walking with the wrist terminal 11 being attached to a wrist, a user is usually swinging the arms back and forth with the arms pulled down. In this case, sensor data indicating that motion is obtained. When the user is handling a steering wheel to drive a car, sensor data indicating that motion is obtained. When the user is holding on to a strap or is sitting on a seat on a train, sensor data indicating that motions is obtained. Further, in normal situations or at night, sensor data is obtained according to the motion pattern of the user in normal situations or at night.

The present state of the user can be more precisely determined if location data of the GPS section 28 is used in addition to the sensor data analysis.

Further, the wrist terminal 11 determines whether the user is rotating the wrist, using the output data of the sensor section 26 (Step E12). If the user is rotation the wrist ("Yes" in Step E13), the wrist terminal 11 determines the presence of the flip action shown in FIG. 4 and switches the initial timekeeping screen to display information.

More specifically, the wrist terminal 11 selectively reads various information from the specific area of the memory 25 based on the state of the user and the number of the wrist rotating actions taken by the user, with reference to the priority setting table 53 shown in FIG. 11 stored in the memory 25, and displays the information on the screen of the display section 22 (Step E14). In this way, when the user is, for example, "walking", information on "where you are now (map service)" is displayed if the user has taken the flip action once by lifting the arm up to the face, and "weather information" is displayed if the user has taken the flip action twice.

Moreover, if the user puts the arm down ("Yes" in Step E15), the wrist terminal 11 changes the screen from the information display screen back to the initial timekeeping screen (Step E16). On the other hand, if the user does not rotate the wrist or put the arm down ("No" in Step E15), the wrist terminal 11 determines the state of the user while maintaining the current display state (Step E17).

As described above, in the present embodiment, various types of information on the network that the mobile terminal 12 has received can be checked by the wrist terminal 11. In this case, information on an item set in advance is selected from among the various information and is displayed in such a manner that the user takes the predetermined action, wearing the wrist terminal 11 on the wrist. This makes it possible to exclusively display and check necessary information easily at any time, without troublesome operations for information display.

In addition, determining the state of the user, using the output data of the sensor makes it possible to display information according to the respective states of the user at different times, including times when the user is walking and being on a train. In this case, if the output data of the sensor obtained by actual motions of the user in the daily life is associated in advance with the respective states of the user when the user is making the motions, the current state of the user is precisely determined and information is displayed accordingly.

Moreover, if the priority of information is set, various information can be displayed in order of the set priority every time the predetermined action is taken.

The wrist terminal 11 is in the shape of a watch so as to be attached to a wrist of a user, and acquires various information from the mobile terminal in a bag, etc. by short-distance wireless communication. The user can selectively view the information only by taking the action of rotating a wrist with the wrist terminal 11 being attached to the wrist. The actions that a user can take in order to switch displayed information are not limited to rotation of a wrist and may include swinging an arm or vibrating an arm.

The method for each processing by the wrist terminal 11 and the database described in the embodiment, in other words, the processing and the database shown in the flowcharts of the drawings can be stored, as programs that the computer can execute, into an external storage medium (not shown in the drawings) such as a memory card (ROM card, RAM card, etc.), a magnetic disk (floppy disk, hard disk, etc.), an optical disk (CD-ROM, DVD, etc.), or a semiconductor memory, and can be distributed. Further, the computer of a mobile electronic device provided with the motion sensor reads the programs stored in the external storage medium into the memory 25, and the read programs control the operations. This procedure makes it possible to realize the functions described in the embodiment.

While the present invention has been described with reference to the embodiments, it is to be understood that the embodiments are only exemplary and are not intended to limit the scope of the invention. It is also to be understood that the new embodiments can be reduced to practice in other different manners, various omissions, replacements, and alterations may occur insofar as they are within the scope of the invention, and the embodiments and the alterations thereof are within the scope and the gist of the invention as well as within the scope of the invention disclosed in the appended claims and the equivalents thereof.

What is claimed is:

1. An information display device comprising:
    a device body;
    a display configured to display information;
    a motion detection sensor provided in the device body; and
    a processor which is configured to:
        acquire a plurality of types of information;
        detect a predetermined action of a user from output data of the motion detection sensor; and
        selectively display, on the display, one of the acquired plurality of types of information based on a set display order, each time the processor detects the same predetermined action of the user,
    wherein the display order is set by an operation which is not performed at the information display device and which is solely performed at an external device external to the information display device.

2. The information display device according to claim 1, wherein:
    the processor is further configured to determine an activity state of the user based on output data of the motion detection sensor;
    the information display device further comprises a memory which stores a state table that is configured to associate in advance output data of the motion detection sensor obtained by an actual motion of the user in daily life with an activity state of the user when the user is making the motion, and to store the output data and the activity state; and
    the processor determines the activity state of the user from the output data of the motion detection sensor with reference to the state table.

3. The information display device according to claim 2, wherein the processor selectively displays the plurality of types of information in the set display order.

4. The information display device according to claim 3, wherein:
    the device body is in a shape of a watch so as to be attachable to a wrist of the user, and
    the processor acquires various types of information by short-distance wireless communication from a mobile terminal in the proximity of the device body while the device body is attached to the wrist of the user.

5. An information display system comprising:
    a body-worn device; and
    an electronic device,
    wherein the body-worn device includes:
        a device body;
        a display;
        a motion detection sensor provided in the device body; and
        a first processor which is configured to:
            acquire a plurality of types of information from the electronic device;
            detect a predetermined action of a user from output data of the motion detection sensor; and
            selectively display, on the display, one of the acquired plurality of types of information based on a set display order, each time the first processor detects the same predetermined action of the user, wherein the display order is set by an external operation which is not performed at the body-worn device and which is solely performed at an external device external to the body-worn device; and
    wherein the electronic device includes:
        a second processor which is configured to acquire the information from a server storing the information for the body-worn device and to output the acquired information to the body-worn device.

6. The information display system according to claim 5, wherein the second processor is configured to:
    determine a type of information to be output to the body-worn device, and
    acquire the determined type of information from the server and outputs the acquired information to the body-worn device.

7. The information display system according to claim 6, wherein:
the second processor of the electronic device acquires the information by periodically accessing the server, and
the first processor of the body-worn device determines at regular intervals whether communication is possible with the electronic device, and acquires the information from the electronic device in a case where communication is possible.

8. The information display system according to claim 7, wherein the external operation is performed at the electronic device, and
wherein the second processor of the electronic device is configured to:
set the display order for displaying the plurality of types of information to be displayed in the body-worn device, in accordance with the external operation, which is performed at the electronic device; and
output data based on the set display order to the body-worn device.

9. The information display system according to claim 8, wherein the body-worn device and the electronic device each include a short-distance wireless communication section for data communication between the body-worn device and the electronic device.

10. A non-transitory computer-readable storage medium having stored thereon a program that is executable by a computer installed in an electronic device including a motion detection sensor and a display, the program being executable by the computer to cause the computer to carry out functions comprising:
acquiring a plurality of types of information;
detecting a predetermined action of a user from output data of the motion detection sensor; and
performing display control to selectively display, on the display, one of the plurality of types of information acquired, based on a set display order, each time the same predetermined action of the user is detected,
wherein the display order is set by an operation which is not performed at the electronic device and which is solely performed at an external device external to the electronic device.

11. The non-transitory computer-readable storage medium according to claim 10, wherein:
the program further causes the computer to carry out functions comprising:
determining an activity state of the user based on output data of the motion detection sensor; and
generating a state table storing in advance a correlation of output data of the motion detection sensor obtained by an actual motion of the user in a daily life and an activity state of the user when the user is making the motion, and storing the state table into a memory, and
in the determining, the activity state of the user is determined from the output data of the motion detection sensor with reference to the state table.

12. The non-transitory computer-readable storage medium according to claim 11, wherein in the display control, the plurality of types of information are selectively displayed in the set display order.

13. The non-transitory computer-readable storage medium according to claim 12, wherein:
the electronic device is in a shape of a watch so as to be attachable to a wrist of the user, and
in the acquiring, various types of information are acquired by short-distance wireless communication from a mobile terminal in the proximity of a device body of the electronic device while the electronic device is attached to the wrist of the user.

14. The information display device according to claim 1, wherein the processor selectively displays, one at a time, the acquired plurality of types of information, according to the set display order, such that each time the same predetermined action is detected, a next one of the plurality of types of information is displayed according to the set display order.

15. The information display system according to claim 5, wherein the first processor of the body-worn device selectively displays, one at a time, the acquired plurality of types of information, according to the set display order, such that each time the same predetermined action is detected, a next one of the plurality of types of information is displayed according to the set display order.

16. The non-transitory computer-readable storage medium according to claim 10, wherein performing the display control comprises selectively displaying, one at a time, the plurality of types of information acquired, according to the set display order, such that each time the same predetermined action is detected, a next one of the plurality of types of information is displayed according to the set display order.

17. The information display device according to claim 1, wherein the processor is configured to:
acquire a first type of information and a second type of information,
set a first order for the first type of information and a second order for the second type of information, and
display the first type of information having the first order in a case in which the processor detects the predetermined action of the user, and then, if the processor again detects the same predetermined action of the user, to display the second type of information having the second order.

18. The information display device according to claim 1, wherein the processor is configured to set the display order as a priority for displaying the plurality of types of information.

19. The information display device according to claim 1, wherein the processor is further configured to:
determine an activity state of the user based on output data of the motion detection sensor, and
set the display order for displaying the plurality of types of information based on the determined activity state of the user.

20. The information display device according to claim 1, wherein the processor is configured to set the display order for the plurality of types of information in accordance with the external operation which is performed by a user on a setup screen on a display of the external device which is external to the information display device.

21. The information display device according to claim 1, wherein the processor is configured to receive the display order, and wherein the display order is set by the external operation which is performed by a user at the external device.

22. The information display device according to claim 21, wherein the processor is configured to set the display order, when a user starts a function of setting the display order at the external device.

23. The information display device according to claim 22, wherein the external device comprises a display and a second processor, and the second processor is configured to display a setting screen on the display of the external device, when a user starts a function of setting the display order at the external device.

24. The information display device according to claim 1, wherein the processor is further configured to:
- register a plurality of display orders for each of a plurality of activity states, in accordance with the operation performed at the external device;
- detect a current activity state of the user from output data of the motion detection sensor;
- select one of the plurality of display orders as the set display order, based on the detected activity state; and
- selectively display one of the plurality of types of information based on the selected display order.

25. The information display device according to claim 1, wherein a display of the external device is larger than the display of the information display device.

* * * * *